United States Patent
Kato

[15] 3,656,150
[45] Apr. 11, 1972

[54] CODE CONVERSION SYSTEM

[72] Inventor: Kotaro Kato, Tokyo, Japan

[73] Assignee: Nippon Electric Company, Limited, Tokyo, Japan

[22] Filed: Feb. 20, 1970

[21] Appl. No.: 13,013

[30] Foreign Application Priority Data

Feb. 26, 1969 Japan....................................44/14814
Feb. 26, 1969 Japan....................................44/148415

[52] U.S. Cl. ..........................340/347 DD, 178/50, 179/15 R
[51] Int. Cl. ............................................................G06f 5/00
[58] Field of Search ...................340/347, 146.1; 178/50, 58, 178/66–68; 179/15, 15.55; 328/103, 104, 105; 325/38; 235/154, 173, 153

[56] References Cited

UNITED STATES PATENTS 3,394,224 7/1968 Helm.......................................178/50
3,337,864 8/1967 Lender..................................340/347
3,358,083 12/1967 Helm.................................340/347 X
3,435,147 3/1969 Malm..................................178/50 X
3,456,199 7/1969 Van Gerwen......................340/347 X
3,512,150 5/1970 Ohnsorge..............................340/347

*Primary Examiner*—Maynard R. Wilbur
*Assistant Examiner*—Charles D. Miller
*Attorney*—Marn and Jangarathis

[57] ABSTRACT

When providing a summing conversion in a binary system or in a system having a radix of $2^m$, where $m$ is a positive integer equal to or greater than 2, in which a plurality of trains of binary coded signals having a low repetition rate are multiplexed into a single train or a plurality of trains of coded signals of a higher repetition rate with the multiplexed signals representing a summing conversion of input binary signals, the invention performs the logical operations for summing and carry operation on the coded signals of the low repetition rate, and then multiplexes the converted signals into a train or trains of the higher repetition rate. Conversely, a train of binary coded signals or trains of signals coded in $2^m$-coding system of a high repetition rate in which each signal represents a summing conversion are initially demultiplexed according to the invention, into a plurality of trains of coded signals of a lower repetition rate before performing the logical operations for differential conversion and carry operation to recover the plurality of trains of the original coded signals of the low repetition rate.

14 Claims, 10 Drawing Figures

Figure 1:
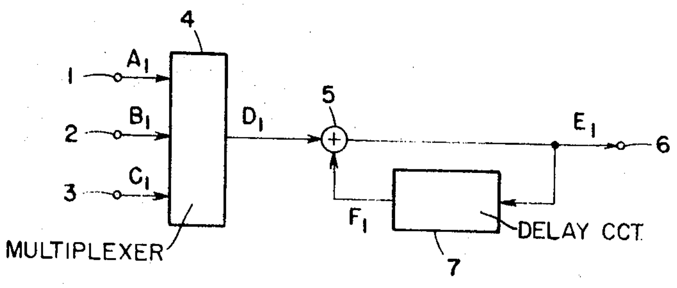

INVENTOR
Kotaro Kato
BY
Marn & Jangarathis
ATTORNEYS

PATENTED APR 11 1972 3,656,150

INVENTOR.
Kotaro Kato
BY
Marn & Jangarathis
ATTORNEYS

INVENTOR.
Kotaro Kato
BY
Marn & Jangarathis
ATTORNEYS

INVENTOR.
Kotaro Kato

BY

Marn & Jangarathis
ATTORNEYS

INVENTOR
Kotaro Kato
BY
Marn & Jangarathis
ATTORNEYS

CODE CONVERSION SYSTEM

The invention relates to a code conversion system, and more particularly to such system which provides a summing conversion in forming a train or trains of coded signals of a high repetition rate from a plurality of trains of coded signals of a low repetition rate, by adding successive two signals from the low rate trains in a cyclic manner, and/or which provides a reverse conversion for signals formed by the summing conversion.

There has been proposed a code conversion system in which a plurality of trains of coded signals having a low repetition rate are multiplexed into a single train of coded signals of a higher repetition rate, and in which a binary summing conversion is directly applied to the coded signals of the higher rate train for transmission to a receiving point where the converted signals are directly subjected to a binary differential conversion before the higher rate train is demultiplexed to recover the original trains of coded signals of the low repetition rate. The term "binary summing conversion" is intended herein to mean the formation of a binary sum, at a particular position in time sequence of the higher rate train of the conversion output obtained one bit position earlier and the binary number that should be supplied at that particular position in time from one of *n* trains (*n* being a positive integer greater than one) of binary coded signals, when *n* such trains of coded signals, each representing either binary ONE or binary ZERO, are multiplexed into a single train of coded signals of a higher repetition rate. Similarly, the term, "binary differential conversion" is defined herein to mean a binary subtraction between two consecutively appearing bits in the train of coded signals which are formed by the binary summing conversion.

There has also been proposed a code conversion system in which a plurality of trains of coded signals of a low repetition rate are multiplexed into a pair of trains of coded signals of a higher repetition rate, and in which a quaternary summing conversion is directly applied to the pair of high rate trains of coded signals for transmission to a receiving point where the converted signals are subjected directly to a quaternary differential conversion before being demultiplexed into the original trains of coded signals of the low repetition rate. Thus, a plurality of trains of binary coded signals are multiplexed into a pair of trains of binary coded signals of a higher repetition rate, and assuming that each train of higher rate corresponds to different digit of a binary number, that is, to digit $2^0$ or $2^1$, respectively, it is then possible to consider that at any position in time, the higher rate trains of coded signals may assume some combination of digits shown in Table 1, thereby representing a quaternary number which is either one of 0, 1, 2 or 3.

TABLE 1

| digit $2^1$ | digit $2^0$ | quaternary number |
|---|---|---|
| 0 | 0 | 0 |
| 0 | 1 | 1 |
| 1 | 0 | 2 |
| 1 | 1 | 3 |

The term "quaternary summing conversion" refers to a quaternary addition of the conversion output which is produced at a position one bit earlier in the time sequence of the higher rate train and a quaternary number that is to be supplied from the higher rate trains at a particular point in time. If the sum of such addition exceed 3, a multiple of 4 is subtracted from the sum to produce a resultant number that is either one of 0, 1, 2 or 3. Similarly, the term "quaternary differential conversion" refers to a quaternary subtraction of a quaternary number represented by bits appearing at a particular time in the higher rate trains from that quaternary number which is represented by immediately preceding bits. If the difference becomes negative, any multiple of 4 is added to give a result which is either 0, 1, 2 or 3. The resulting pair of trains of quaternary coded signals are demultiplexed into a plurality of trains of binary coded signals of the low repetition rate, as originally used for the quaternary summing conversion.

It is known that such a binary or quaternary summing conversion ultra high speed PCM multiplex communication system, and a binary or quaternary differential conversion can similarly advantageously be applied to a 2-phase or 4-phase demodulator in such system.

As mentioned previously, in the prior art, the summing conversion is applied after coded signal trains of a lower repetition rate have been multiplexed into a higher rate train of coded signals, and the differential conversion is directly applied to the multiplexed train of the higher rate before the latter is demultiplexed into a plurality of lower rate, coded signal trains. Thus the logical operations involved with the summing or differential conversion are performed on the multiplexed train or trains of the higher rate, with consequence that as a bit rate in the higher rate train of coded signals increases, a correspondingly high demand is imposed on the operational speeds of logical circuit elements, and a further increase in the bit rate will eventually render it difficult to form such logical elements with semiconductor integrated circuits. Then these logical elements will have to be formed by discrete circuits, which is unfavorable in view of an increased number of components.

Therefore, it is an object of the invention to provide a summing or differential conversion system which is capable of an ultra high speed operation.

It is another object of the invention to provide a binary summing conversion system capable of an ultra high speed operation.

It is a further object of the invention to provide a binary differential conversion system capable of an ultra high speed operation.

It is still another object of the invention to provide a quaternary summing conversion system capable of an ultra high speed operation.

It is a still further object of the invention to provide a quaternary differential conversion system capable of an ultra high speed operation.

It is an yet another object of the invention to provide a system for summing conversion generally in a number system having a radix of $2^m$, where *m* is a positive integer, and which is capable of an ultra high speed operation.

It is an yet further object of the invention to provide a system for differential conversion generally in a number system having a radix of $2^m$ and which is capable of an ultra high speed operation.

An additional object of the invention is to provide a summing or differential conversion system which is capable of ultra high speed operation and which can be implemented by semiconductor integrated circuits.

According to the invention, code conversion or logical operation is not performed on the train of coded signals of a higher repetition rate, but code conversion is initially applied to groups of trains of lower rate, coded signals to be multiplexed, and subsequent multiplexing provides the same multiplexed higher rate train of coded signals for a summing conversion as obtained in the prior art system. Similarly, an oncoming train of coded signals of a higher rate is initially demultiplexed, upon reception, into a number of trains of lower rate, coded signals which were originally multiplexed on the transmitting side, and subsequent code conversion or logical operation on the lower rate trains provides the same differential conversion for the number of lower rate trains of coded signals as in the prior art system.

More specifically, the principle of the invention will be described below. Where a plurality of lower rate trains of coded signals or bits are multiplexed into a higher train on bit basis, then it will be appreciated that bits from successive lower rate trains will appear in turn in the higher rate train. Thus two lower rate trains, bits of which appear in succession in the higher rate train, will have a delay therebetween corresponding to one bit position of the higher rate train. Taking this one bit delay into consideration, a logical sum or an Exclusive OR is made with a bit from one lower rate train and the conversion output of that lower rate train is to be situated one bit position earlier in the multiplexed higher rate train. An Exclusive OR is known to have a binary ONE output when and only when two inputs thereto are different, as shown in Table 2 below, and will be referred to hereinafter simply as "sum."

TABLE 2

| Input 1 | Input 2 | Exclusive OR output |
|---|---|---|
| 0 | 0 | 0 |
| 0 | 1 | 1 |
| 1 | 0 | 1 |
| 1 | 1 | 0 |

By repeating the above procedure for every lower rate train in turn to produce lower rate conversion outputs, the multiplexing of these lower rate conversion outputs on bit basis will provide the same conversion output as obtained in the binary summing conversion system of the prior art where lower rate trains are initially multiplexed and then subjected to a code conversion.

When providing a summing conversion in a number system having a radix of $2^m$, the above described procedure is repeated for every digit, that is, for each group of lower rate trains corresponding to digits $2^0$, $2^1$, $2^2$ and so on to produce the conversion outputs of lower rate trains, which are then multiplexed. In addition, a first carry signal is produced as the logical product of the coded signal of each lower rate train of a group and the complement of the code conversion output of that train, and additionally a second carry signal is produced as the logical product of the coded signal of each train and a carry signal from that group of lower rate trains which corresponds to the next lower digit from the digit represented by the first mentioned group. A logical sum of the first and second carry signals is used as a carry to the group of lower rate trains corresponding to the next higher digit from the digit represented by the first mentioned group, and a logical sum is made of said carry and the coded signal of each train of the group of the next higher digit. This provides the same carry operation in the higher rate train as effected in the prior art summing conversion system.

Considering the differential conversion, assuming that the oncoming higher rate train of coded signals represent a binary summing conversion multiplexed on bit basis, then it will be seen that if the bits of the higher rate train are directly divided, on bit basis, into separate channels without code conversion, the immediately adjacent channels or trains of bits will have a delay therebetween that corresponds to one bit interval of the higher rate train. Therefore, the higher rate train is initially demultiplexed into lower rate trains, and the above one bit delay is taken into consideration in providing a differential conversion by taking a logical sum of the coded signal of one divided or demultiplexed lower rate train and the coded signal of another demultiplexed lower rate train which was situated one bit position earlier in the higher rate train. By providing such a differential conversion successively between any adjacent lower rate trains, the resulting lower rate trains of coded signals will be entirely equivalent to those obtained by providing a binary differential conversion initially for the higher rate train and then demultiplexing it into lower rate trains.

For a differential conversion in a number system having a radix of $2^m$, each higher rate train corresponding to the respective digit is demultiplexed into a group of lower rate trains, and in each group, a logical sum is made of the coded signal of one train and the coded signal of another lower rate train which was situated one bit position earlier in the higher rate train. In addition, the carry operation is provided by producing a first carry signal as the logical product of the complement of the coded signal of a lower rate train and the differential conversion output of this train. A second carry signal is produced as the logical product of the coded signal of a lower rate train and a carry from the next lower digit group of lower rate trains, and a logical sum of the first and second carry signals is supplied as a carry to the next higher digit group of lower rate trains where the carry is logically summed with the coded signal of the corresponding lower rate train thereof.

Figure 2:
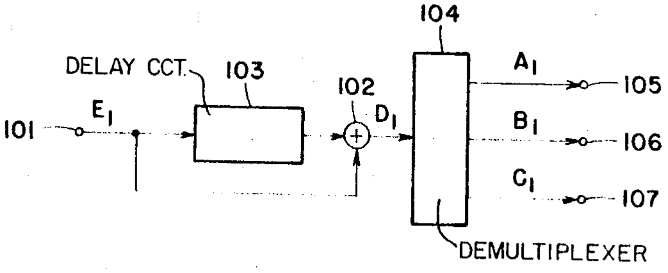
Figure 3:
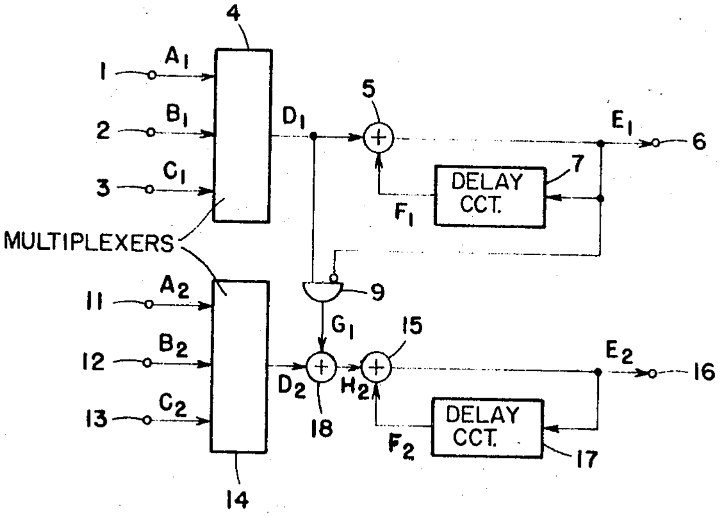
Figure 4:
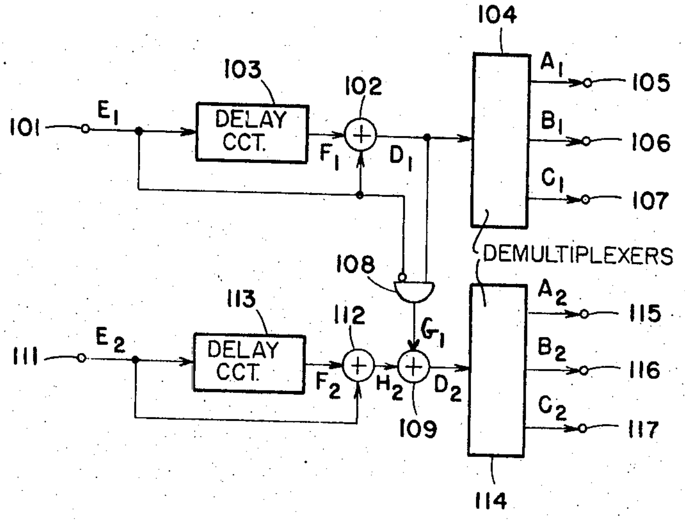
Figure 5:
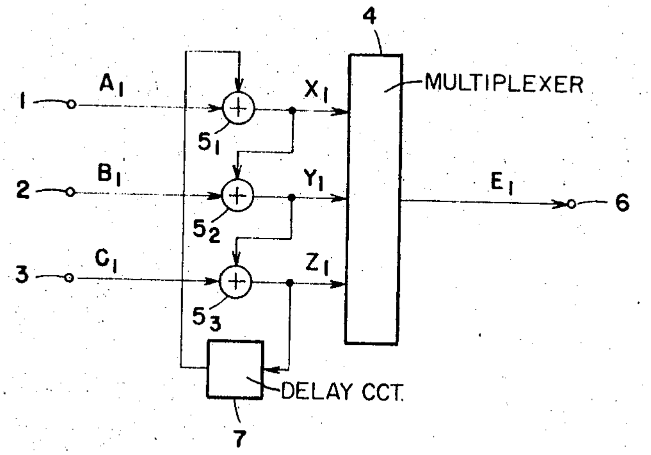
Figure 6:
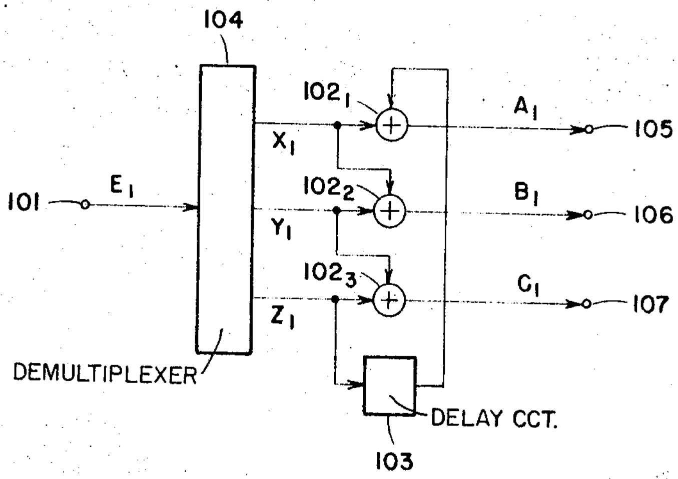
Figure 8:
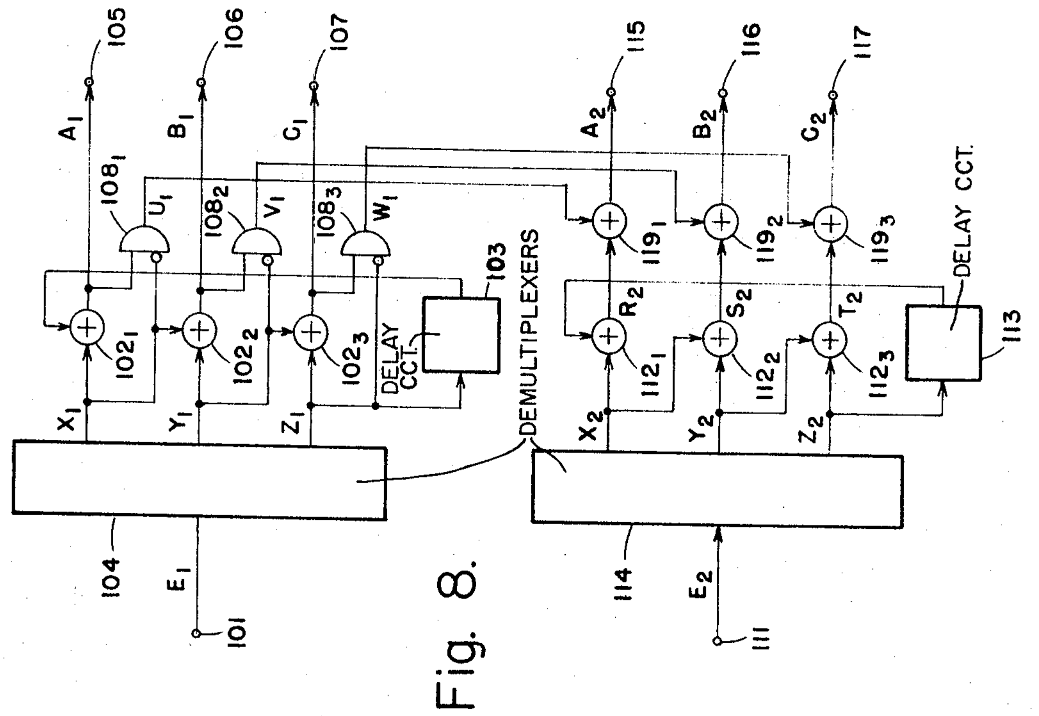
Figure 7:
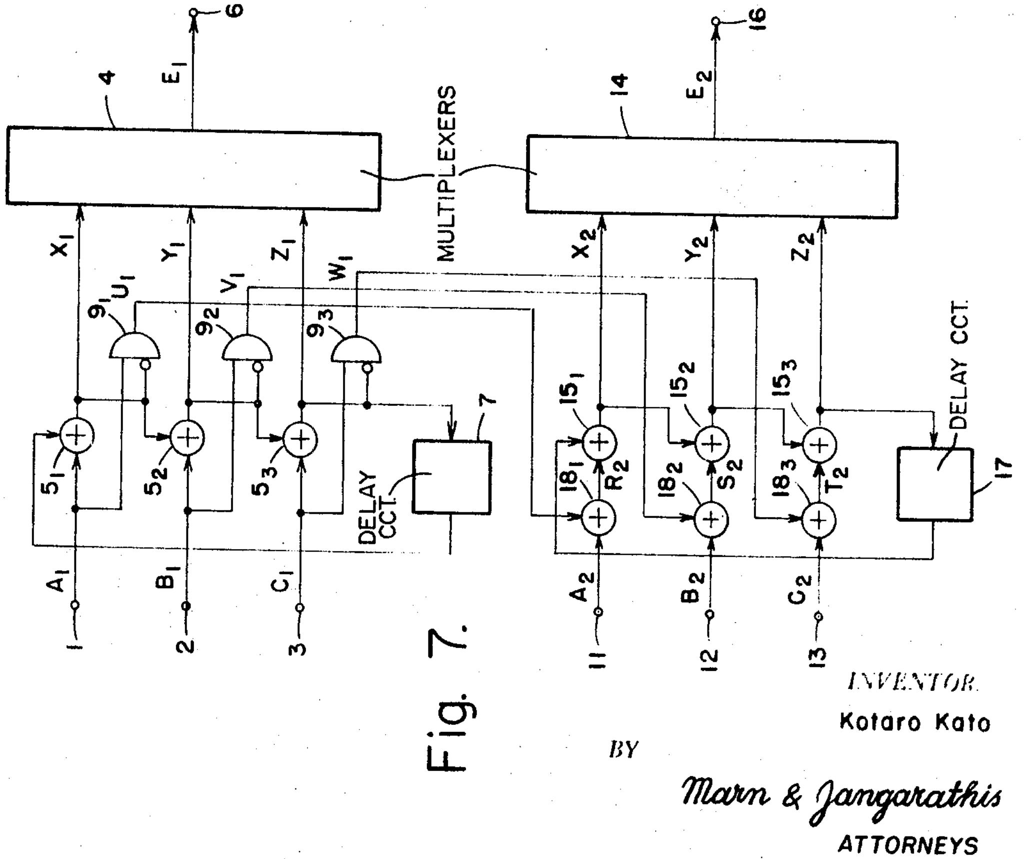
Figure 9:
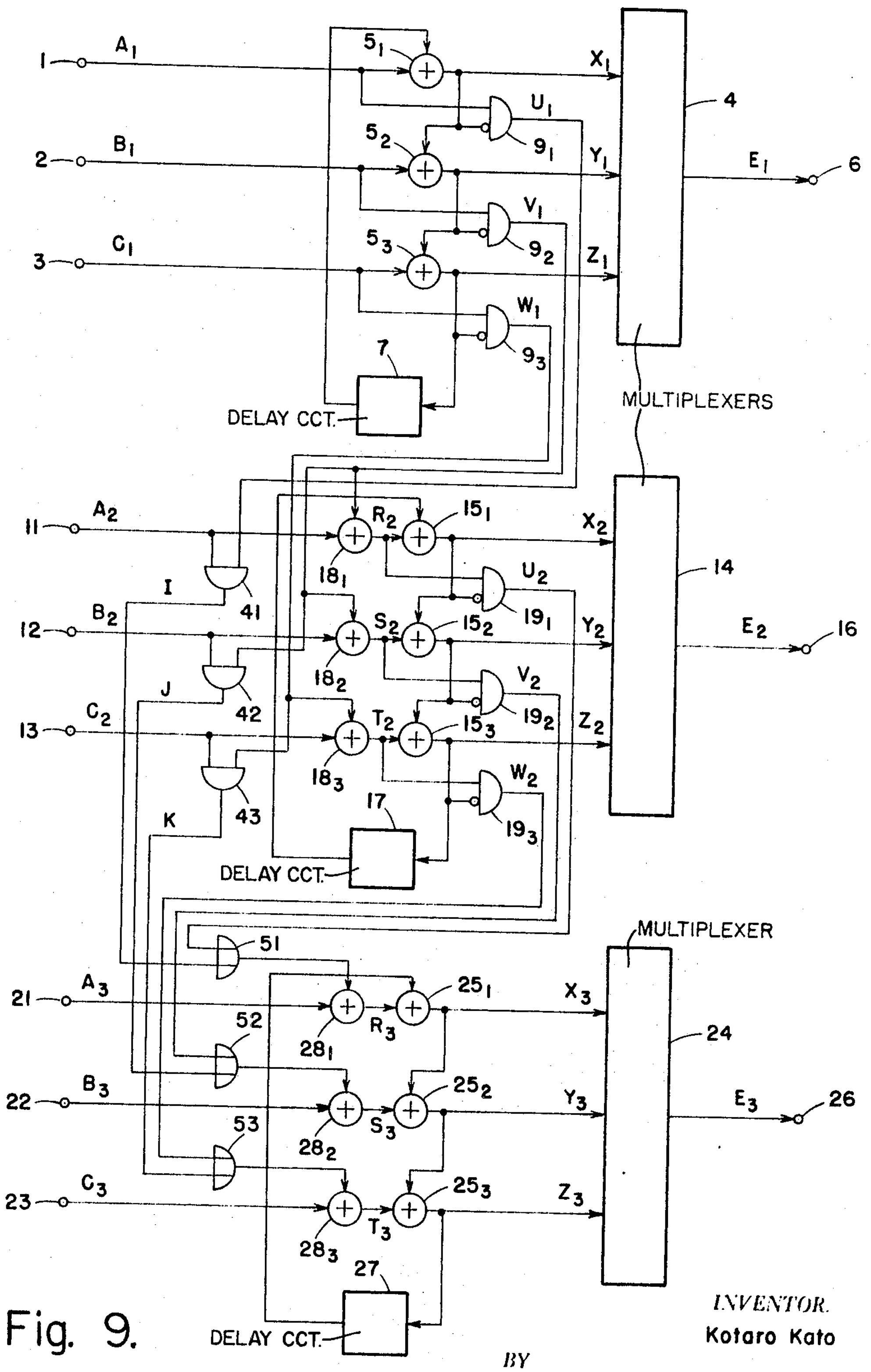
Figure 10:
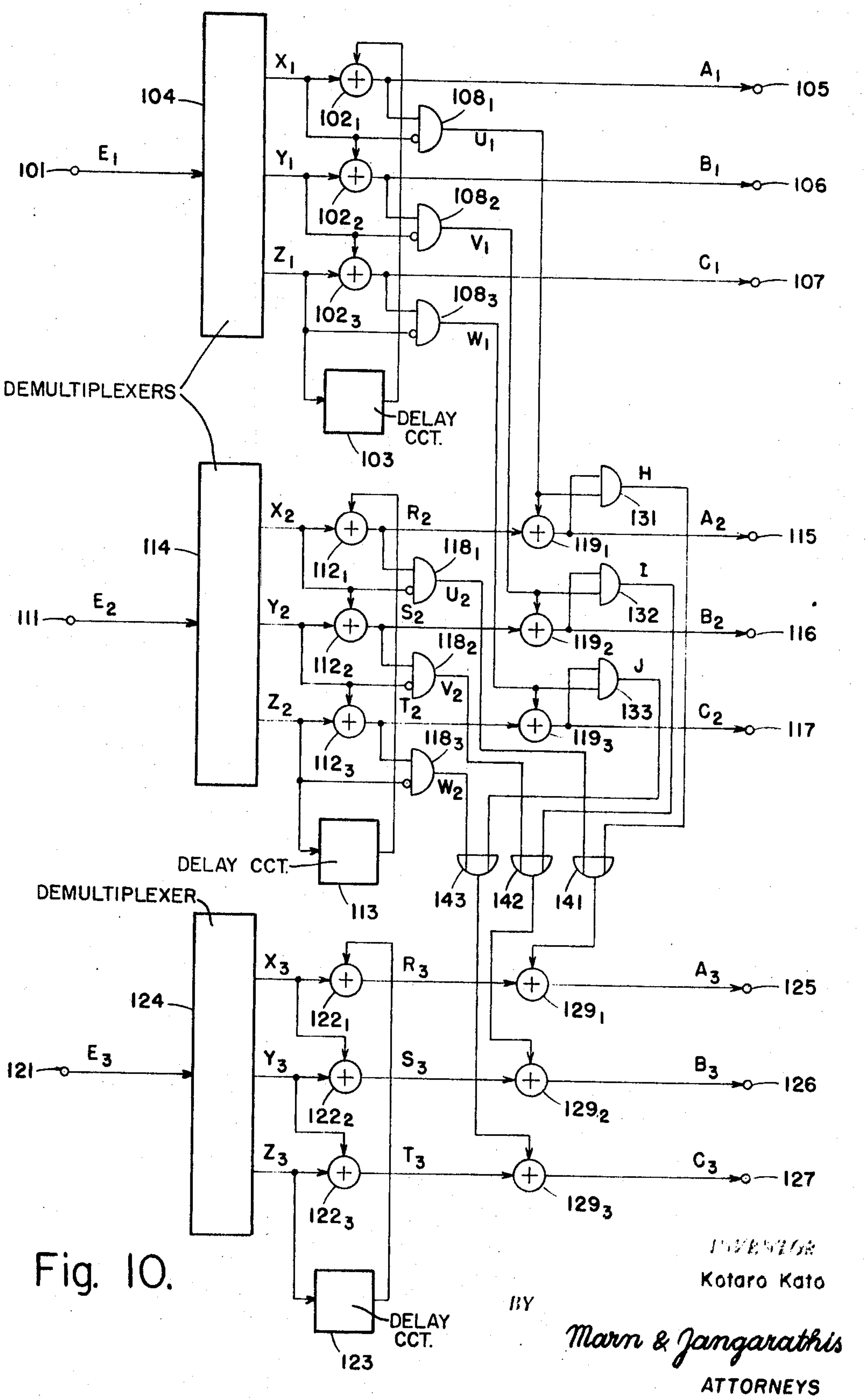

The above and other objects, features and advantages of the invention will be apparent from the following description of the embodiments of the summing and differential conversion system shown in the drawings, wherein:

FIG. 1 shows an arrangement for binary summing conversion of the prior art,

FIG. 2 shows an arrangement for binary differential conversion of the prior art, FIG. 3 shows an arrangement for quaternary summing conversion of the prior art, FIG. 4 shows an arrangement for quaternary differential conversion of the prior art, FIG. 5 shows an arrangement for binary summing conversion according to one embodiment of the invention, FIG. 6 shows an arrangement for binary differential conversion according to one embodiment of the invention, FIG. 7 shown an arrangement for quaternary summing conversion according to one embodiment of the invention, FIG. 8 shows an arrangement for quaternary differential conversion according to one embodiment of the invention, FIG. 9 shown an arrangement for octonary summing conversion according to one embodiment of the invention, and FIG. 10 shown an arrangement for octonary differential conversion according to one embodiment of the invention.

Referring to the drawings, the prior art system will be described first with reference to FIGS. 1 to 4. In FIG. 1, three channels of lower rate coded signals are multiplexed and then subjected to a binary summing conversion. Specifically, at input terminals 1, 2 and 3 are supplied binary coded signals or bits of lower rate trains $A_1 = a_1, a_2, ..., B_1 = b_1, b_2, ...$ and $C_1 = c_1, c_2, ...$, respectively, where $a_1$, $a_2$, $b_1$, $b_2$, $c_1$, $c_2$ represents either binary ONE or binary ZERO, and bits on different trains are synchronized with each other. These trains of coded signals are multiplexed in a time division fashion by a multiplexer 4, on bit basis, to produce a higher rate train of binary coded signals, $D_1 = a_1, b_1, c_1, a_2, b_2, c_2 ...$ . The train $D_1$ is supplied to a sum circuit 5. A part of the summing conversion output $E_1$ obtained at the output terminal 6 of the sum circuit 5 is returned to the latter through a delay circuit 7 which provides a time delay of one bit interval of the higher rate train $D_1$, the delayed train being denoted by $F_1$. The sum circuit 5 is operative to execute the arithmetic operation indicated in the Table 2 above in response to the two binary inputs $D_1$ and $F_1$. Thus, there will be obtained at the output terminal 6 a train of binary summing conversion outputs, $E_1 = a_1, a_1 + b_1, a_1 + b_1 + c_1, a_1 + b_1 + c_1 + a_2, a_1 + b_1 + c_1 + a_2 + b_2, a_1 + b_1 + c_1 + a_2 + b_2 + c_2 ...$ .

FIG. 2 shows a prior art circuit for applying a binary differential conversion upon the higher rate train $E_1$. The train $E_1$ received at an input terminal 101 is directly supplied to a sum circuit 102, and is also supplied to the latter through a delay circuit 103 that provides a time delay of one bit interval, the delayed input being denoted by $F_1$. The sum circuit 102 is operable to make an Exclusive OR output from the two input $E_1$ and $F_1$. Thus when two consecutive bits of the higher rate train $E_1$ are different, the sum circuit 102 determines that the coded signal that existed on the transmitting side before the summing conversion was binary ONE. In other words, the sum circuit 102 provides a differential conversion by producing binary ONE when the coded signals from the trains $E_1$ and $F_1$ disaccord, and producing binary ZERO when the coded signals from the trains $E_1$ and $F_1$ are coincident. Thus, the conversion output from the sum circuit 102 $D_1$ will be equal to the higher rate train produced by the multiplexer 4 in FIG. 1; thus $D_1 = a_1, a_1 + b_1 - a_1, a_1 + b_1 + c_1 - (a_1 + b_1), a_1 + b_1 + c_1 + a_2 - (a_1 + b_1 + c_1), a_1 + b_1 + c_1 + a_2 + b_2 - (a_1 + b_1 + c_1 + a_2) ... = a_1, b_1,$ $c_1, a_2, b_2, \ldots$ . This differential conversion output $D_1$ is supplied to a demultiplexer 104 which operates to distribute the coded signals of the higher rate $E_1$ into a number of lower rate trains originally multiplexed, the distribution being into three channels in the present example and on bit basis. Thus three lower rate train of coded signals $A_1 = a_1, a_2 \ldots, B_1 = b_1, b_2 \ldots$ and $C_1 = c_1, c_2 \ldots$ are recovered at output terminals 105, 106 and 107, in the original form as supplied to the input terminals 1, 2 and 3 of FIG. 1.

An example of quaternary summing conversion circuit of the prior art is shown in FIG. 3. In the example shown, six trains of lower rate, coded signals $A_1, B_1, C_1, A_2, B_2\ C_2$ are classified into two groups $A_1$, $B_1$, $C_1$ and $A_2$, $B_2$, $C_2$ to form two trains of coded signals for quaternary summing conversion. The conversion for the first group is quite the same as described above in connection with FIG. 1. The conversion for the second group is essentially the same, but in order to obtain a carry signal, a logical product of the higher rate train $D_1$ and the complement of the conversion output $E_1$ is produced by a product circuit 9, which operates to provide the logical operation indicated in Table 3 below, producing a binary ONE carry output $G_1$ when and only when the conversion output $E_1$ is binary ZERO and the higher rate train signal is binary ONE.

TABLE 3

| $E_1$ | $D_1$ | $G_1$ |
|---|---|---|
| 0 | 0 | 0 |
| 0 | 1 | 1 |
| 1 | 0 | 0 |
| 1 | 1 | 0 |

Thus when both $D_1$ and $F_1$ are binary ONEs, $E_1$ is binary ZERO, so that the product circuit 9 produces a carry output $G_1$ of binary ONE. Lower rate trains of coded signals $A_2$, $B_2$ and $C_2$ are supplied to input terminals 11, 12 and 13, respectively, and are multiplexed by a multiplexer 14 to generate a higher rate train $D_2$. A sum or logical sum of the train $D_2$ and the carry output $G_1$ is made by a sum circuit 18, of which output $H_2$ is supplied to another sum circuit 15. A part of the conversion output produced by the sum circuit 15 at an output terminal 16 is fed back to the sum circuit 15 through a delay circuit 17 which generates a time delay corresponding to one bit interval of the higher rate train. Thus, the trains of coded signals $E_1$ and $E_2$ obtained at the output terminals 6 and 16 correspond to the first and second digits of a binary number which represents a quaternary number in a binary fashion, completing a quaternary summing conversion for lower rate trains of coded signals $A_1$, $B_1$, $C_1$, $A_2$, $B_2$, and $C_2$.

FIG. 4 shows a prior art circuit for providing a reverse conversion on the converted trains $E_1$ and $E_2$. The differential conversion for the first or lowest digit train $E_1$ is quite same as described with reference to FIG. 2, and hence like parts are designated by corresponding numerals. When the higher rate train $D_1$ on the transmitting side has bits "1, 1" in succession, the conversion output train $E_1$ will be "1,0." Therefore, there has been a carry operation effected during the summing conversion when the conversion output train $E_1$ is "0" and its delayed signal $F_1$ is "1", or when the train $E_1$ is "0" and the conversion output $D_1$ is "1." To reflect this, a product circuit 108 is used to make a logical product of the complement of the summing conversion output $E_1$ and the conversion output $D_1$ to produce a carry signal $G_1$. The product circuit 108 operates to produce binary ONE for $F_1$ only when $E_1$ is binary ZERO and $D_1$ is binary ONE. The other higher rate train $E_2$ of summing conversion output is applied to an input terminal 111, and thence directly to a sum circuit 112, and is also supplied to the latter through a one bit delay circuit 113. The conversion output $H_2$ from the sum circuit 112 is supplied to another sum circuit 109, where it is logically summed with the carry signal $G_1$ from the product circuit 108 to produce an output $D_2$ which is supplied to a demultiplexer 114. The demultiplexer 114 functions to distribute the bits of the output $D_2$ into three channels on bit basis, thereby recovering the original lower rate trains of coded signals $A_2$, $B_2$ and $C_2$ at output terminals 115, 116 and 117. This completes the quaternary differential conversion.

As will be noted, in the binary or quaternary summing conversion system of the prior art, circuit elements 5, 9, 15 and 18 to provide logical operations on the higher rate trains $D_1$ and $D_2$, and similarly in the binary or quaternary differential conversion system, circuit elements 102, 108, 109 and 112 had to provide logical operations on the higher rate trains $E_1$ and $E_2$. As a result, it has been difficult to form such conversion system of high speed operation with semiconductor integrated circuits.

This difficulty is advantageously removed with the summing or differential conversion system of the present invention. Referring first to FIG. 5, a binary summing conversion system will be described. For the purpose of facilitating the comparison with the prior art system of FIG. 1, same three trains of coded signals of a lower rate $A_1$, $B_1$ and $C_1$ are converted by a binary summing conversion into a higher rate train of coded signals $E_1$. The lower rate trains $A_1$, $B_1$ and $C_1$ applied to input terminals 1, 2 and 3 are supplied to sum circuits $5_1$, $5_2$ and $5_3$, respectively. The lower rate conversion outputs $X_1$, $Y_1$ and $Z_1$ from these sum circuits are supplied to a multiplexer 4. In addition, lower rate conversion outputs $X_1$ and $Y_1$ are supplied to the sum circuits $5_2$ and $5_3$, respectively. The sum circuit $5_2$ form a sum of the lower rate conversion output $X_1$ and the lower rate train signal $B_1$ to produce the lower rate conversion output $Y_1$, which is supplied to the sum circuit $5_3$ to be summed with the lower rate train signal $C_1$, thereby producing the lower rate conversion output $Z_1$. The lower rate conversion output $Z_1$ is supplied to the sum circuit $5_1$ through a delay circuit 7 which is arranged to produce a time delay of one bit period in the lower rate train. The sum circuit $5_1$ forms a sum of the delayed conversion output $Z_1$ and the lower rate train signal $A_1$ to produce the lower rate conversion output $X_1$. The lower rate conversion outputs $X_1$, $Y_1$ and $Z_1$ thus obtained are multiplexed by a multiplexer 4, thereby producing a higher rate train of binary summing conversion output $E_1$ at an output terminal 6.

Assuming that the lower rate trains $A_1$, $B_1$ and $C_1$ comprise $a_1, a_2 .., b_1, b_2 \ldots$ and $c_1, c_2 \ldots$ , respectively, as was mentioned previously, the first bit of the lower rate conversion outputs $X_1$, $Y_1$ and $Z_1$ will be $a_1$, $a_1 + b_1$ and $a_1 + b_1 + c_1$, respectively. Since the signal $(a_1 + b_1 + c_1)$ is delayed by one bit period before being applied to the sum circuit $5_1$, the second bit of the lower rate conversion outputs $X_1$, $Y_1$ and $Z_1$ will be $a_1 + b_1 + c_1 + a_2$, $a_1 + b_1 + c_1 + a_2 + b_2$, and $a_1 + b_1 + c + a_2 + b_2 + c_2$, respectively. Similar process is repeated, and the resulting lower rate conversion outputs $X_1$, $Y_1$ and $Z_1$ are multiplexed on bit basis, so that the output $E_1$ of the multiplexer 4 will have a train containing $a_1, a_1 + b_1, a_1 + b_1 + c_1, a_1 + b_1 + c_1 + a_2, a_1 + b_1 + c_1 + a_2 + b_2 \ldots$, which is the same as the higher rate conversion output $E_1$ obtained at the output terminal 6 of the prior art system shown in FIG. 1.

The higher rate train of binary summing conversion outputs $E_1$ may be subjected to a binary differential conversion by a system as shown in FIG. 6. Thus the oncoming higher rate train of coded signals $E_1$ applied to an input terminal 101 is initially supplied to a demultiplexer 104 which distributes the input signals on bit basis into three channels, producing lower rate trains of coded signals $X_1$, $Y_1$ and $Z_1$. These lower rate trains are supplied to sum circuits $102_1$, $102_2$ and $102_3$, respectively. Sum circuits $102_2$ and $102_3$ form a sum of lower rate train signals $X_1$ and $Y_1$, and of lower rate train signals $Y_1$ and $Z_1$, respectively, to produce lower rate trains of converted coded signals $B_1$ and $C_1$, respectively. The demultiplexed lower rate train $Z_1$ is also supplied to a delay circuit 103 which provides a time delay of one bit period in the lower rate train, and the sum circuit $102_1$ forms a sum of the output of the delay circuit 103 and the demultiplexed lower rate train signal $X_1$ to produce a lower rate train of converted, coded signals $A_1$ Because the oncoming higher rate train $E_1$ includes a sequence of coded signals $a_1, a_1+b_1, a_1+b_1+c_1, a_1+b_1+c_1+a_2, a_1+b_1+c_1+a_2$ 30 $b_2$, ... the demultiplexed lower rate trains will be such that $X_1=a_1, a_1+b_1+c_1+a_2, \ldots, Y_1=a_1+b_1, a_1+b_1+c_1+a_2+b_2, \ldots$, and $Z_1=a_1+b_1+c_1, a_1+b_1+c_1+a_2+b_2+c_2, \ldots$. An Exclusive OR is an operation equivalent to a subtraction, as mentioned above in connection with the binary differential conversion system. Thus, the outputs of the sum circuits 102$_1$, 102$_2$ and 102$_3$ will be $a_1$, $a_1+b_1-a_1=b_1$, and $a_1+b_1+c_1-(a_1+b_2)=c_1$, respectively, for the first bit, and taking into consideration the fact that the first bit of $Z_1$, $a_1+b_1+c_1$, is supplied to the sum circuit 102$_1$ after a delay of one bit period, the second bit outputs will be $a_1+b_1+c_1+a_2-(a_1+b_1+c_1)=a_2$, $a_1+b_1+c_1+a_2+b_2-(a_1+b_1+c_1+a_2)=b_2$, and $a_1+b_1+c_1+a_2+b_2+c_2-(a_1+b_1+c_1+a_2+b_2)=c_2$. The similar operation is repeated for the third and sequential bits, and hence the lower rate trains of converted, coded signals are such that $A_1=a_1, a_2 \ldots$, $B_2=b_1, b_2 \ldots$, and $C_1=c_1, c_2 \ldots$, which are the same as the original lower rate trains as supplied for summing conversion on the transmitting side, and also fully coincide with the conversion outputs obtained with the binary differential conversion system of the prior art.

Referring now to FIG. 7, an example of the quaternary summing conversion system according to the invention will be described below. The example is given for a comparable arrangement to the prior art system of FIG. 3 where two groups each comprising three trains of lower rate, coded signals $A_1$, $B_1$ and $C_1$ and $A_2$, $B_2$ and $C_2$ are converted by a summing conversion into a pair of higher rate trains of coded signals. The summing conversion for the lower rate trains $A_1$, $B_1$ and $C_1$ which correspond to the first or lowest digit is completely the same as is performed by the binary summing conversion system of the invention shown in FIG. 5, and therefore, like parts are denoted by corresponding numerals. In the quaternary summing conversion, it is necessary to form a carry signal from the first digit to the next higher, second digit.

At this end, product circuits 9$_1$, 9$_2$ and 9$_3$ are provided to make a logical product of the original lower rate train signal $A_1$, $B_1$ and $C_1$ and the complement of the corresponding lower rate conversion output $X_1$, $Y_1$ and $Z_1$, respectively, to produce carry signals $U_1$, $V_1$ and $W_1$, respectively. The lower rate trains of coded signals $A_2$, $B_2$ and $C_2$ for the second digit are applied to input terminals 11, 12 and 13, respectively, and thence to sum circuits 18$_1$, 18$_2$ and 18$_3$, where they are summed with the carry signals $U_1$, $V_1$ and $W_1$, respectively. The outputs $R_2$, $S_2$ and $T_2$ of these sum circuits are supplied to sum circuits 15$_1$, 15$_2$ and 15$_3$, respectively, and the lower rate conversion outputs $X_2$, $Y_2$ and $Z_2$ from the latter are supplied to a multiplexer 14 which produces the higher rate conversion output $E_2$ for the second digit at an output terminal 16. The lower rate conversion output $X_2$ and $Y_2$ are also supplied to the sum circuits 15$_2$ and 15$_3$, respectively, to be summed with the lower rate signals $S_2$ and $T_2$, respectively. Finally the lower rate conversion output $Z_2$ is supplied through a one bit delay circuit 17, which produces a time delay of one bit period of the lower rate train, to the sum circuit 15$_1$, where a logical sum is made of this output $Z_2$ and the lower rate signal $R_2$. The higher rate trains of converted, coded signals $E_1$ and $E_2$ thus obtained are identical to those obtained by the quaternary summing conversion system of the prior art shown in FIG. 3.

A reverse conversion on the higher rate trains of quaternary summing conversion outputs $E_1$ and $E_2$ may be provided by a quaternary differential conversion system of the invention shown in FIG. 8. Here again, the operation on the first digit train $E_1$ is entirely the same as that described above with reference to FIG. 6, and will not be described in detail since corresponding numerals used to denote like parts will enable such operation to be readily understood. However, in order to produce a carry signal from the first digit, a product circuit 108$_1$ is provided to make a logical product of the complement of the demultiplexed lower rate train signal $X_1$ and its converted, lower rate train signal $A_1$, thereby producing a carry signal $U_1$. Similarly, product circuits 108$_2$ and 108$_3$ are provided to produce carry signals $V_1$ and $W_1$ as the logical product of the complement of the demultiplexed lower rate train signals $Y_1$, $Z_1$ and their converted, lower rate train signals $B_1$, $C_1$, respectively.

The oncoming higher rate train of coded signals $E_2$ for the second digit received at an input terminal 111 is also distributed on bit basis by a demultiplexer 114 onto lower rate trains of coded signals $X_2$, $Y_2$ and $Z_2$. These trains are supplied to sum circuits 112$_1$, 112$_2$ and 112$_3$. Sum circuits 112$_2$ and 112$_3$ form a sum of demultiplexed lower rate train signals $X_2$ and $Y_2$, and $Y_2$ and $Z_2$, respectively, to produce converted outputs $S_2$ and $T_2$. The demultiplexed lower rate train Z is supplied to the sum circuit 112$_1$ through a delay circuit 113 which produces a time delay of one bit period of the lower rate train, thereby producing a converted output $R_2$ as the sum of the delayed output and the demultiplexed lower rate train signal $X_2$. These converted outputs $R_2$, $S_2$ and $T_2$ are supplied to sum circuits 119$_1$, 119$_2$ and 119$_3$, respectively, where they are summed with carry signals $U_1$, $V_1$ and $W_1$ from the first digit trains to produce lower rate trains of converted, coded signals $A_2$, $B_2$ and $C_2$ at output terminals 115, 116 and 117, respectively.

Now referring to FIG. 9, an octonary summing conversion according to the invention will be described. In the example shown, it is intended that three groups of lower rate trains of coded signals $A_1$, $B_1$, $C_1$; $A_2$, $B_2$, $C_2$; and $A_3$, $B_3$, $C_3$ are converted into three higher rate trains of coded signals $E_1$, $E_2$ and $E_3$ corresponding to each of three digits in an octonary system. As will be readily appreciated, the operations involved with the formation of the first and second digit trains $E_1$ and $E_2$ are the same as described before with reference to FIG. 7. In addition, product circuits 19$_1$, 19$_2$ and 19$_3$ are provided to form logical products of the complement of the lower rate conversion outputs $X_2$, $Y_2$ and $Z_2$ from the sum circuits 15$_1$, 15$_2$ and 15$_3$ and the corresponding lower rate signals $R_2$, $S_2$ and $T_2$ which has undergone a carry operation to produce a first carry signal $U_2$, $V_2$ and $W_2$ from the second digit. Further, product circuits 41, 42 and 43 are provided to form the respective logical products of the carry signal $U_1$, $V_1$ and $W_1$ from the first digit and the lower rate train signal $A_2$, $B_2$ and $C_2$ of the second digit to produce a second carry signal I, J and K. By way of an example, the second carry signal I will be binary ONE only when both the carry signal $U_1$ and the lower rate signal $A_2$ are binary ONEs, and since the lower rate output signal $R_2$ from the sum circuit 18$_1$ is binary ZERO, the first carry signal $U_2$ from the product circuit 19, is necessarily binary ZERO. In other words, at any time, there will be no binary ONE second carry signal concurrently with the corresponding first carry signal. Hence, the first carry signal $U_2$, $V_2$ and $W_2$ and the second carry signal I, J and K are supplied to OR circuits 51, 52 and 53, respectively, to produce a carry signal to the third digit.

On the other hand, lower rate trains of coded signals $A_3$, $B_3$ and $C_3$ are applied to input terminals 21, 22 and 23, respectively, and their logical sum with the carry signal from the OR circuits 51, 52 and 53 is made by sum circuits 28$_1$, 28$_2$ and 28$_3$, of which outputs $R_3$, $S_3$ and $T_3$ are supplied to further sum circuits 25$_1$, 25$_2$ and 25$_3$, respectively, the lower rate conversion output $X_3$, $Y_3$ and $Z_3$ obtained from the latter sum circuits being supplied to a multiplexer 24 for multiplexing operation on bit basis to produce a higher rate conversion output $E_3$ at an output terminal 26. The lower rate conversion outputs $X_3$ and $Y_3$ are supplied to the sum circuits 25$_2$ and 25$_3$, respectively, to be logically summed with the lower rate signals $S_3$ and $T_3$, and the lower rate conversion output $Z_3$ is supplied through a one bit delay circuit 27 to the sum circuit 25$_1$ to be summed with the lower rate signal $R_3$.

An octonary differential conversion system which provides a reverse conversion on the higher rate trains of octonary summing conversion outputs $E_1$, $E_2$ and $E_3$ thus produced is shown in FIG. 10. As will be readily noted from the comparison of FIG. 8 and FIG. 10, the conversion relating to the two lowest digit trains $E_1$ and $E_2$ are the same as that described before in connection with the quaternary differential conversion system shown in FIG. 8, and therefore will not be described in detail. The differential conversion for the third digit train $E_3$ requires a carry signal from the second digit to the third digit, which is produced in the following manner. Logical products of the conversion outputs $R_2$, $S_2$ and $T_2$ from sum circuits 112$_1$, 112$_2$ and 112$_3$ and the complement of the demultiplexed lower rate train signals $X_2$, $Y_2$ and $Z_2$ are formed by produce circuits 118$_1$, 118$_2$ and 118$_3$, respectively, which produce a first carry signal $U_2$, $V_2$ and $W_2$. In addition, in order to produce another carry signal which should occur by the carry operation of the demultiplexed lower rate trains which is caused by a carry signal from the first digit, logical products of the lower rate, converted signals $A_2$, $B_2$ and $C_2$ and the carry signal $U_1$, $V_1$ and $W_1$ from the first digit are formed by product circuits 131, 132 and 133, respectively, whereby a second carry signal H, I and J.

The higher rate train of coded signals $E_3$ is received at an input terminal 121 and supplied to a demultiplexer 124 which divides the train into three lower rate trains of coded signals $X_3$, $Y_3$ and $Z_3$. These lower rate trains $X_3$, $Y_3$ and $Z_3$ are supplied to sum circuits 122$_1$, 122$_2$ and 122$_3$, respectively, and the trains $X_3$ and $Y_3$ are also supplied to the sum circuits 122$_2$ and 122$_3$, respectively, to produce conversion outputs $S_3$ and $T_3$. The demultiplexed lower rate train $Z_3$ is supplied to the sum circuit 122$_1$ through a delay circuit 123 which produces a time delay of one bit interval of the lower rate train, whereby a conversion output $R_3$ is obtained. These conversion outputs $R_3$, $S_3$ and $T_3$ are supplied to sum circuits 129$_1$, 129$_2$ and 129$_3$, respectively, to be summed with the corresponding carry signal from the second digit position. As was previously described in connection with the first and second carry signals to the third digit position in the summing conversion, there can be no simultaneous presence of the first and second carry signals, since in order for the secondary carry signal H, for example, to be binary ONE, $U_1$ must be binary ONE together with $R_2$ which is binary ZERO, so that the corresponding first carry signal $U_2$ becomes binary ZERO irrespective of the value of $X_2$. Hence, the first carry signal $U_2$, $V_2$ and $W_2$ and the corresponding second carry signal H, I and J are combined together in OR circuits 141, 142 and 143, respectively, and thence supplied to the sum circuits 129$_1$, 129$_2$ and 129$_3$, which perform the required carry operation. The outputs from the circuits 129$_1$, 129$_2$ and 129$_3$ are lower rate trains of converted, coded signals $A_3$, $B_3$ and $C_3$ obtained at output terminals 125, 126 and 127.

As will be noted from the foregoing, in the summing conversion system of the present invention, the logical operations inclusive of code conversion and carry operation are performed on the lower rate trains of coded signals before the latter is converted into a higher rate train or trains, and the multiplexing operation is conducted after the logical operations have been completed. Since in the above examples, three lower rate trains are multiplexed into a single higher rate train, the required speed for the logical operations may be one third the speed that has been required in the summing conversion system of the prior art. This means that the whole system can be constructed with logic elements of relative low operational speeds and hence readily implemented with semi-conductor integrated circuits. Conversely, the invention enables a summing conversion of coded signal trains of a speed higher (in the examples given, three times higher) than the maximum speed coded signal trains processable with the prior art system to be performed with the use of comparable logic elements, thereby rendering it possible to provide an ultra high speed summing conversion. The same applies to the differential conversion system of the present invention, since the higher rate train or trains are initially demultiplexed into lower rate trains, on which the logical operations inclusive of code conversion and carry operation are performed.

It should be noted that the embodiments shown in FIGS. 5 to 10 are only exemplary of the basic arrangement of the invention. Thus, while in the above description, three lower rate trains are converted into a single higher rate train and vice versa, the number of such lower rate trains need not be restricted to three. By utilizing the nature of arithmetic operations in the binary logic system, the logical circuit arrangements other than those illustrated may be employed as well. For example, in FIGS. 7 and 9, the sum circuit 18$_1$ forms a sum of the lower rate signal $A_2$ and the carry signal $U_1$, and subsequently the output $R_2$ of this sum circuit is summed with the output of the delay circuit 17 in the sum circuit 15$_1$. However, in view of the interchangeability of the sequence of operation for an Exclusive OR which is proven true in the arithmetic operation of binary logic, the same result can be obtained by forming the sum of the lower rate signal $A_2$ and the output of the delay circuit 17 initially and then summing the sum just mentioned with the carry signal $U_1$. This applies also to each of the combinations of the sum circuits 15$_2$ and 18$_2$, 15$_3$ and 18$_3$, 25$_1$ and 28$_1$, 25$_2$ and 28$_2$, and 25$_3$ and 28$_3$. It also applies to the interchangeability of each combination of sum circuits 112$_1$ and 119$_1$, 112$_2$ and 119$_2$, 112$_3$ and 119$_3$, 122$_1$ and 129$_1$, 122$_2$ and 129$_2$, and 122$_3$ and 129$_3$ shown in FIG. 8 and 10. Furthermore, the invention is not restricted to binary, quaternary and octonary code conversion, but is equally applicable when $m$ $N$ lower rate trains of binary coded signals (where both $m$ and $N$ are positive integers greater than one) are multiplexed to form a summing conversion in a number system having a radix of $2^m$. In such an instance, $m$ $N$ lower rate trains of binary coded signals are divided into $m$ groups each including $N$ trains, and a summing conversion is performed within each group. The operation for the first or lowest group of lower rate trains is similar to that described above in connection with FIG. 9 in converting the lower rate trains $A_1$, $B_1$ and $C_1$. To the N lower rate trains of the first group is applied a summing operation to produce $N$ lower rate trains of summing conversion outputs, which are multiplexed to produce the higher rate conversion outputs, and additionally, a group of N carry signals to the second digit position are produced. The operation on each of from 2nd to $(m-1)$-th groups of lower rate trains is similar to that described in connection with the lower rate trains $A_2$, $B_2$ and $C_2$ concerning the embodiment of FIG. 9. Taking an $n$-th group for example $(2 \leqq n \leqq m-1)$, based on a group of carry signals from the (n - 1)-th group of lower rate trains and the coded signals in the lower rate trains of the $n$-th group, both a carry operation and a summing operation are performed to produce $N$ summing conversion outputs which are to be multiplexed on bit basis and also to produce $N$ carry signals to the $(n+1$-th group of lower rate trains. The operation on the $m$-th group of lower rate trains is similar to that performed on the lower rate trains $A_3$, $B_3$ and $C_3$ described with reference to FIG. 9, in that a group of carry signals from the $(m-1)$-th group and the coded signals in the lower rate trains of the $m$-th group are used to perform both a carry operation and a summing operation to produce $N$ code conversion outputs for the $m$-th group which are to be multiplexed on bit basis.

When considering the carry signals, it should be noted that while the only possible carry signals to the second group of lower rate trains are those attributed to the summing conversion of the coded signals of the lower rate trains in the first group, for each of the groups higher than the third, a carry signal to a particular group may occur not only by the summing conversion of the coded signals in the lower rate trains of the next lower group, but also as a result of the carry operation which may be occasioned in said next lower group by a carry signal thereto from its immediately preceding group, or the second lower group as considered from the group in question. Thus the carry signal Gn to the n-th group, $(3 \leqq n \leqq m)$, comprises a first carry signal that is determined by the coded signal of each lower rate train of the $(n-1)$-th group, $Hn_{-1}$ (for example, $A_2$, $B_2$ or $C_2$ in FIG. 9), and the complement of its converted signal or lower rate conversion output, $Ln_{-1}$ ($X_2$, $Y_2$ or $Z_2$ in FIG. 9), and a second carry signal that is determined by the coded signal of each lower rate train of the $(n-1)$-th group, $Hn_{-1}$, and a carry signal $P_n$ $_{-2}$ ($U_1$, $V_1$ or $W_1$ in FIG. 9) which originated from the code conversion of the lower rate train signal of the ($n-2$)-th group. The relation of these parameters are illustrated in Table 4 below.

TABLE 4

| $H_n-1$ | $L_n-1$ | $P_n-2$ | $G_n$ |
|---|---|---|---|
| 0 | 0 | 0 | 0 |
| 0 | 1 | 0 | 0 |
| 1 | 0 | 0 | 1 |
| 1 | 1 | 0 | 0 |
| 0 | 0 | 1 | 0 |
| 0 | 1 | 1 | 0 |
| 1 | 0 | 1 | 1 |
| 1 | 1 | 1 | 1 |

The differential conversion system can similarly be generalized, using the model that m higher rate trains are each converted into $N$ lower rate trains by a differential conversion in a number system having a radix of $2^m$, both $m$ and $N$ being positive integers greater than 1 as before. In this instance, the operation on the first or lowest group is similar to that described with respect to the first digit, higher rate train $E_1$ of the embodiment shown in FIG. 10. Thus the first higher rate train of coded signals are demultiplexed on bit basis into $N$ lower rate trains of a first group, and a differential conversion is applied to these lower rate trains of coded signals to produce the first group of $N$ lower rate trains of conversion outputs and $N$ carry signals to the next or second group of lower rate trains. For an $n$-th higher rate train ($2 \leqq n \leqq m-1$), the operation is similar to that performed on the second digit, higher rate train $E_2$ described in connection with FIG. 10. Thus, the $n$-th higher rate train of coded signals are initially demultiplexed into N lower rate trains of an $n$-th group, and based on these $N$ lower rate trains of coded signals and $N$ carry signals from the ($n-1$)-th group, both carry operation and differential conversion are performed to produce the $n$-th group of $N$ lower rate trains of conversion outputs and $N$ carry signals from the $n$-th to the ($n+1$)-th group of lower rate trains. Finally, the $m$-th higher rate train is processed in the similar manner as described with respect to the third digit, higher rate train $E_3$ in the embodiment of FIG. 10. Thus the $m$-th higher rate train of coded signals are initially demultiplexed into $N$ lower rate trains of an $m$-th group, and these demultiplexed lower rate trains of coded signals are used together with $N$ carry signals from the ($m-1$)-th group to perform both carry operation and differential conversion to produce the $m$-th group of $N$ lower rate trains of conversion outputs.

While the invention has been described with reference to particular embodiments shown, it should be obvious that various modifications and changes are obvious to those skilled in the art without departing from the spirit of the invention, and therefore it is intended that the invention be solely limited by the appended claims.

What is claimed is:

1. A code conversion system for summing conversion of $m$ $N$ trains of binary coded signals having a low repetition rate, where both $m$ and $N$ are integers not less than 2, said trains being divided into m groups each including $N$ trains, said system comprising a circuit for performing a summing operation on the trains of low rate coded signals of the first group to produce $N$ trains of summing conversion outputs of a first group, a circuit to produce a group of $N$ carry signals from the first group of low rate trains of coded signals to the second group of low rate trains of coded signals, ($m-2$) circuits each operable to perform a carry operation and a summing operation on a group of carry signals from an ($n-1$)-th group of low rate trains of coded signals and an $n$-th group of low rate trains of coded signals to produce an $n$-th group of $N$ trains of summing conversion outputs, $n$ being a number from two to ($m-1$), ($m-2$) circuits each operable to produce a group of $N$ carry signals from the $n$-th group of low rate trains to ($n+1$)-th group of low rate trains, a circuit for performing a carry operation and a summing operation on the group of carry signals from the ($m-1$)-th group of low rate trains and the $m$-th group of low rate trains of coded signals to produce an $m$-th group of $N$ trains of summing conversion outputs, and $m$ multiplexing circuits associated with each of the first to $m$-th groups of $N$ trains of summing conversion outputs for multiplexing the summing conversion outputs of the respective groups into a single train of coded signals of a higher repetition rate on bit basis.

2. A code conversion system according to claim 1 in which the circuit to produce the first group of $N$ trains of summing conversion outputs comprises a delay circuit for delaying a code conversion output corresponding to the last train of low rate coded signal by an amount corresponding to one bit period of the low rate train, a circuit to form an exclusive logical sum of the output of the delay circuit and a coded signal of the first low rate train to produce a low rate code conversion output for the first low rate train, and ($N-1$) circuits each operable to form an exclusive logical sum of a low rate code conversion output corresponding to a ($k-1$)-th train of low rate coded signals and a coded signal of the $k$-th low rate train, where $k$ is an integer from two to $N$, thereby producing a low rate code conversion output for the $k$-th low rate train.

3. A code conversion system according to claim 1 in which the circuit to produce a group of $N$ carry signals from the first group of low rate trains to the second group of low rate trains produces a carry signal for a $k$-th low rate train, $k$ being a number from 1 to $N$, by forming a logical product of a coded signal of the $k$-th low rate train and the complement of a code conversion output corresponding to the coded signal of the $k$-th low rate train.

4. A code conversion system according to claim 1 in which the circuit operable to perform a carry operation and a summing operation on an $n$-th group of low rate trains of coded signals to produce an $n$-th group of $N$ trains of low rate summing conversion outputs for any number of $n$ from two to ($m-1$) comprises a circuit to form an exclusive logical sum of $k$-th carry signal from an ($n-1$-th group of low rate trains and a coded signal of a $k$-th low rate train of the $n$-th group to thereby perform a carry operation on the coded signal of the $k$-th low rate train of the $n$-th group for any number of $k$ from one to $N$, a delay circuit for delaying the $N$-th train of coded signals after they have been subjected to said carry operation by an amount corresponding to one bit period of the low rate train, a circuit to form an exclusive logical sum of the output of the delay circuit and a coded signal of the first low rate train after it has been subjected to said carry operation to produce a low rate code conversion output for the first train, and ($N-1$) circuits each operable to form an exclusive logical sum of a coded signal of a $j$-th low rate train and a coded signal of a ($j-1$)-th low rate train after both of these coded signal have been subjected to said carry operation to produce a low rate code conversion output for the $j$-th train of the $n$-th group for any number of $j$ from 2 to $N$.

5. A code conversion system according to claim 1 in which the circuit operable to perform a carry operation and a summing conversion on an $n$-th group of low rate trains of coded signals to produce an $n$-th group of $N$ trains of low rate summing conversion outputs for any number of $n$ from two to ($m-1$) comprises a delay circuit for delaying the $N$-th train of low rate coded signals after they have been subjected to the summing operation by an amount corresponding to one bit period of the low rate train, a circuit to form an exclusive logical sum of the output of the delay circuit and a coded signal of the first low rate train to produce a summing operation output for the first low rate train, ($N-1$) circuits each operable to form an exclusive logical sum of a coded signal of a $k$-th low rate train and a coded signal of a ($k-1$)-th low rate train to produce a summing operation output for the k-th low rate train for a number of $k$ from two to $N$, and $N$ circuits each operable to form an exclusive logical sum of a summing operation output for the $j$-th low rate train of the $n$-th group and a $j$-th carry signal from the $(n-1)$-th group of low rate trains to produce a low rate summing conversion output for the $j$-th train of the $n$-th group for any number of $j$ from 1 to $N$.

6. A code conversion system according to claim 1 in which the circuit operable to produce a group of $N$ carry signals from an $n$-th group of low rate trains to an ($n$ + 1-th group of low rate trains for any number of $n$ from 2 to $(m-1)$ comprises $N$ circuits each operable to produce a first carry signal by forming a logical produce of a low rate coded signal which is to be used as an input to a circuit to form an exclusive logical sum for the summing operation of a $k$-th train of low rate coded signals of the $n$-th group and the complement of the output from the exclusive logical sum circuit, where $k$ is a number from one to $N$, further $N$ circuits each operable to produce a second carry signal by forming a logical product of the two input trains of coded signals to a circuit which forms an exclusive logical sum for the carry operation of the $k$-th low rate train of coded signals, and additional $N$ circuits each operable to form a logical sum of the first and second carry signals from the $k$-th low rate train to produce a carry signal to the $k$-th low rate train of the ($n$ + 1-th group.

7. A code conversion system for differential conversion of $m$ trains of binary coded signals of a high repetition rate, where $m$ is a positive integer not less than 2, said system comprising $m$ demultiplexing circuits operable to demultiplex on bit basis each of the first to $m$-th high rate trains of coded signals into a first to $m$-th groups each including $N$ demultiplexed trains of lower rate coded signals, where $N$ is a positive integer not less than two, a circuit for performing a differential operation on the demultiplexed lower rate trains of coded signals of the first group to produce a first group of $N$ trains of converted, lower rate coded signals, a circuit to produce a group of $N$ carry signals from the first group of lower rate trains to the second group of lower rate trains, $(m-2)$ circuits each operable to perform a differential operation and a carry operation on coded signals of demultiplexed lower rate trains of an $n$-th group and $N$ carry signals from an $(n-1)$-th group of lower rate trains to produce an $n$-th group of $N$ trains of converted, lower rate coded signals for any number of $n$ from two to $(m-1)$, further $(m-2)$ circuits each operable to produce a group of $N$ carry signals from the $n$-th group of lower rate trains to the $(n+1)$-th group of lower rate trains, and a circuit to perform a differential operation and a carry operation on coded signals of demultiplexed lower rate trains of the $m$-th group and $N$ carry signals from the $(m-1)$-th group of lower rate trains to produce an $m$-th group of $N$ trains of converted, lower rate coded signals.

8. A code conversion system according to claim 7 in which the circuit for performing a differential operation on the coded signals of demultiplexed lower rate trains of the first group to produce a first group of $N$ trains of converted, lower rate coded signals comprises a delay circuit for delaying the coded signals of the demultiplexed $N$-th lower rate train by an amount corresponding to one bit period of the lower rate train, a circuit to form an exclusive logical sum of the output of the delay circuit and a coded signal of the first demultiplexed lower rate train to produce a converted coded signal for the first lower rate train, and $(N-1)$ circuits each operable to form an exclusive logical sum of a coded signal of a $k$-th demultiplexed lower rate train and a coded signal of a $(k-1)$-th demultiplexed lower rate train to produce a converted coded signal for the $k$-th lower rate train for a number of $k$ from 2 to $N$.

9. A code conversion system according to claim 7 in which the circuit to produce a group of $N$ carry signals from the first group of demultiplexed lower rate trains to the second group of demultiplexed lower rate trains comprises $N$ circuits each operable to produce a carry signal to a $k$-th demultiplexed lower rate train of the second group by forming a logical product of the complement of a coded signal of the $k$-th demultiplexed lower rate train of the first group and a converted, lower rate coded signal for said $k$-th train of the first group for a number of $k$ from 1 to $N$.

10. A code conversion system according to claim 7 in which the circuit operable to perform a differential operation and a carry operation on coded signals of demultiplexed lower rate trains of an $n$-th group and $N$ carry signals from an $(n-1)$-th group of demultiplexed lower rate trains to produce an $n$-th group of $N$ trains of converted, lower rate coded signals for a number of $n$ from two to $(m-1)$ comprises a delay circuit for delaying the coded signals of the $N$-th demultiplexed lower rate train of the $n$-th group by an amount corresponding to one bit period of the lower rate train, a circuit to perform a differential operation for the first demultiplexed lower rate train of coded signals by forming an exclusive logical sum of the output of the delay circuit and a coded signal of the first demultiplexed lower rate train, $(N-1)$ circuits each operable to perform a differential operation for a $k$-th demultiplexed lower rate train of coded signals by forming an exclusive logical sum of a coded signal of a $(k-1)$-th demultiplexed lower rate train and a coded signal of the $k$-th demultiplexed lower rate train for a number of $k$ from two to $N$, and $N$ circuits each operable to form an exclusive logical sum of a coded signal of a $j$-th demultiplexed lower rate train which has been subjected to said differential operation and a $j$-th carry signal from the $(n-1)$-th group of demultiplexed lower rate trains to produce a converted, lower rate coded signal for the $j$-th train of the $n$-th group for a number of $j$ from 1 to $N$.

11. A code conversion system according to claim 7 in which the circuit operable to perform a differential operation and a carry operation on coded signals of demultiplexed lower rate trains of an $n$-th group and $N$ carry signals from an $(n-1)$-th group of demultiplexed lower rate trains to produce an $n$-th group of $N$ trains of converted, lower rate coded signals for a number of from two to $(m-1)$ comprises $N$ circuits each operable to perform a carry operation on a $j$-th demultiplexed lower rate train of the $n$-th group by forming an exclusive logical sum of a coded signal of the $j$-th demultiplexed lower rate train of the $n$-th group and a $j$-th carry signal from the $(n-1)$-th group of demultiplexed lower rate trains for a number of $j$ from one to $N$, a delay circuit for delaying the coded signals of the $N$-th lower rate train of the $n$-th group after they have been subjected to said carry operation by an amount corresponding to one bit period of the lower rate train, a circuit to form an exclusive logical sum of the output of the delay circuit and a coded signal of the first lower rate train of the $n$-th group after it has been subjected to said carry operation to produce a converted, lower rate coded signal for the first demultiplexed lower rate train of the $n$-th group, and $(N-1)$ circuits each operable to form an exclusive logical sum of a coded signal of a $k$-th lower rate train after it has been subjected to said carry operation and a coded signal of a ($k$ − 1-th lower rate train after it has been subjected to said carry operation to produce a converted, lower rate coded signal for the $k$-th lower rate train of the $n$-th group for a number of $k$ from 2 to $N$.

12. A code conversion system according to claim 7 in which the circuit operable to produce a group of $N$ carry signals from an $n$-th group of lower rate trains to an $(n+1)$-th group of lower rate trains for a number of $n$ from two to $(m-1)$ comprises $N$ circuits each operable to produce a first carry signal by forming a logical product of the complement of a lower rate coded signal which is to be used as an input to a circuit to form an exclusive logical sum for the differential operation of a $k$-th demultiplexed lower rate train of the $(n+1)$-th group and the output of the exclusive logical sum circuit, where $k$ is a number from one to $N$, further $N$ circuits each operable to produce a second carry signal by forming a logical product of the output from a circuit which forms an exclusive logical sum for the carry operation of the $k$-th demultiplexed lower rate train of coded signals and a carry signal from the ($n$ − 1-th group of demultiplexed lower rate trains to the $k$-th demultiplexed lower rate train of the $n$-th group, and additional $N$ circuits each operable to form an exclusive logical sum of the first and second carry signals from the $k$-th lower rate train to produce a carry signal to a $k$-th demultiplexed lower rate train of the ($n+1$-th group.

13. A binary code conversion system, comprising:

a source of $N$ trains of binary coded signals having a low repetition rate, $N$ being an integer of at least 2;

$N$ Exclusive OR logical sum circuits, each having one input activated by a different one of said signal trains;

$N-1$ leads, each connecting an output of one of said sum circuits to a second input of a next succeeding sum circuit, whereby each of $N-1$ sum circuits produces a logical sum of a code conversion output of a preceding sum circuit and a corresponding kth train of ($K-1$) trains of low repetition rate code signals; $k$ being at least a two integer of integers 2 through $N$;

a delay circuit providing a one bit delay corresponding to one bit of said low repetition rate signals for connecting an output of a last of said $N-1$ sum circuits and a second input of a first of said $N$ sum circuits to activate said first sum circuit to produce a logical sum of the code conversion output of said last sum circuit and said code signal train activating said first sum circuit input; and a multiplexer for multiplexing said logical sums in said respective sum circuit outputs on a bit basis into a higher repetition rate train beginning with said first sum circuit and progressing in turn to said last sum circuit and then recurring back to said first sum circuit.

14. A code conversion system for deriving $N$ trains of binary code signals of low repetition rate from a high repetition rate code conversion train of Exclusive OR logical sum signals formed on a bit basis by $N-1$ Exclusive OR logical sum circuits whose inputs are actuated by ($k-1$) trains of said code signals of low repetition rate and code conversion signal outputs of preceding Exclusive OR logical sum circuit and another Exclusive OR logical sum circuit whose inputs are activated by another train of said code signals of low repetition rate and a code conversion signal output provided with a one bit delay corresponding to a one bit of said low repetition rate signals as derived from a last of said $N-1$ Exclusive OR logical sum circuits; $N$ being an integer of at least 2 and $k$ being an integer selected from integers 2 through $N$, comprising:

a demultiplexer for demultiplexing said code conversion signal train of high repetition rate on a bit basis into $N$ trains of code conversion signals of low repetition rate;

$N$ Exclusive OR logical subtraction circuits, each having one input activated by a different one of said last-mentioned $N$ trains of low repetition rate code conversion signals;

$N-1$ leads, each connecting an output of one said sum circuits to a second input of a next succeeding subtraction circuit, whereby each of $N-1$ subtraction circuits responsive to a low repetition rate code conversion signal of a preceding subtraction circuit and a corresponding $k$-th low repetition rate code conversion signal train of ($k-1$) low repetition rate code conversion signal trains produces one of said $N$ binary code signal trains of low repetition rate; and a delay circuit providing a one bit delay corresponding to one bit of said low repetition rate code signals for connecting an input of a last of said $N-1$ subtraction circuits to a second input of a first of said $N$ subtraction circuits for producing another of said $N$ binary code signal trains of low repetition rate.

* * * * *